United States Patent

Matsumoto et al.

[11] 4,399,615
[45] Aug. 23, 1983

[54] DIRECTION INDICATOR

[75] Inventors: Muneaki Matsumoto, Okazaki; Akira Kuno, Oobu; Koji Numata, Toyokawa, all of Japan

[73] Assignee: Nippon Soken, Inc., Nishio, Japan

[21] Appl. No.: 265,688

[22] Filed: May 20, 1981

[30] Foreign Application Priority Data

May 23, 1980 [JP] Japan .................... 55-71553[U]

[51] Int. Cl.³ .......................................... G01C 17/28
[52] U.S. Cl. ................................... 33/361; 324/254
[58] Field of Search ................ 33/361; 324/244, 253, 324/247, 260, 245, 254

[56] References Cited

U.S. PATENT DOCUMENTS

| | | | |
|---|---|---|---|
| 3,952,420 | 4/1976 | Benjamin et al. | 33/361 |
| 4,262,427 | 4/1981 | Lynch | 33/361 |
| 4,267,640 | 5/1981 | Wu | 33/361 |
| 4,277,751 | 7/1981 | Lawson | 33/361 X |

Primary Examiner—Harry N. Haroian
Attorney, Agent, or Firm—Cushman, Darby & Cushman

[57] ABSTRACT

In a direction indicator including a direction sensor having an excitation coil wound on a core and two output coils wound thereon to cross at the right angles with each other, a direct current of given amount is supplied to the two output coils and a direct current magnetic field is produced so that the maximum values of the output signals is made equal by adjusting the gain of the output signals.

3 Claims, 10 Drawing Figures

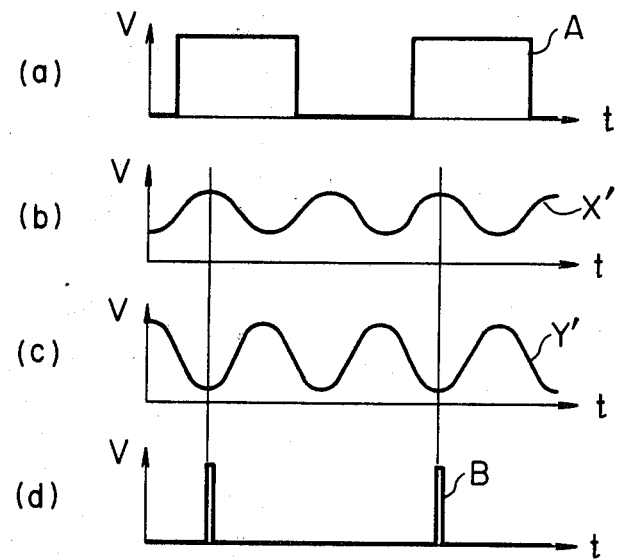
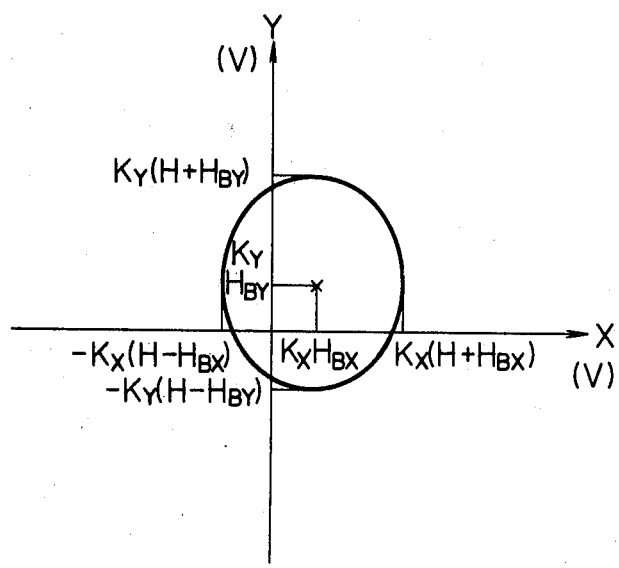

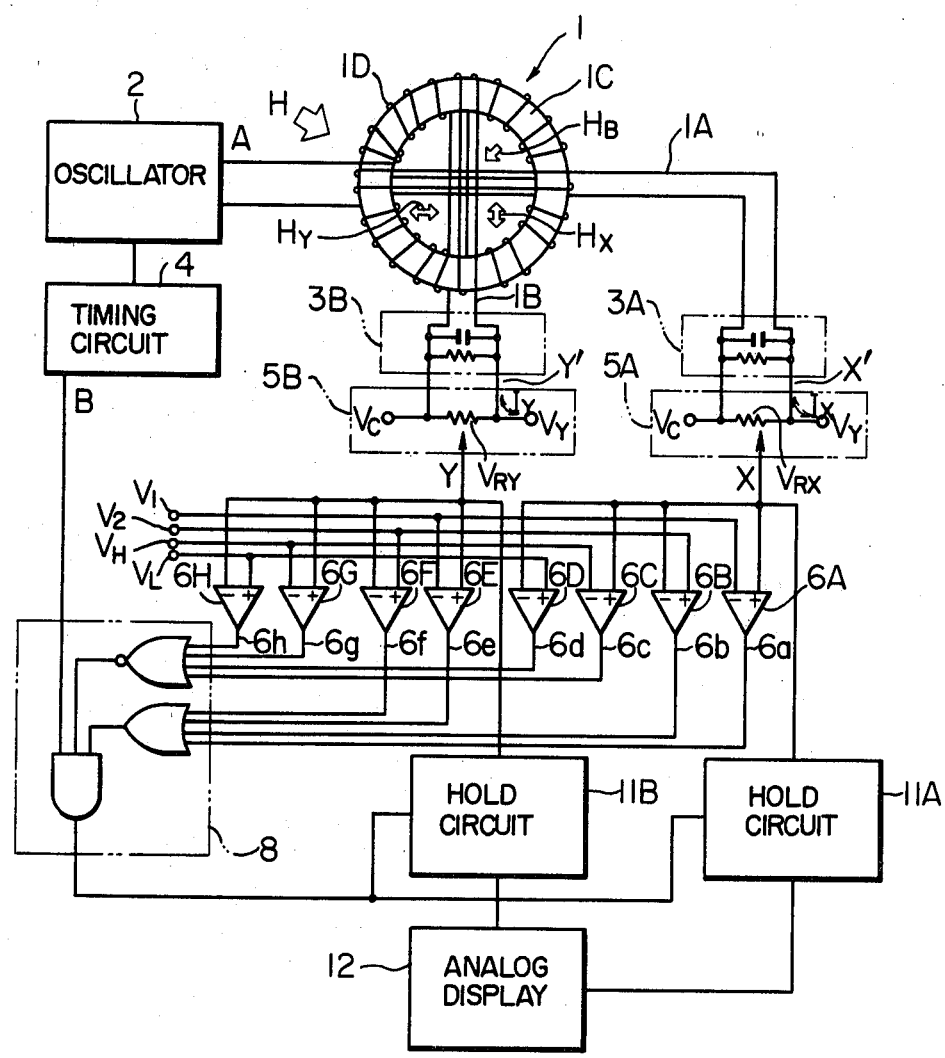
F I G. 5

DIRECTION INDICATOR

CROSS-REFERENCE TO RELATED APPLICATION

This application is related to co-pending U.S. patent application Ser. No. 184,615 entitled "Heading indicating apparatus for vehicles" filed Sept. 5, 1980.

BACKGROUND OF THE INVENTION

This invention relates to direction indicators for indicating the direction of progress of a mobile object such as a vehicle on the basis of the output signal of a direction sensor.

As the direction indicator for indicating the direction according to the output signal of a direction sensor set in the earth magnetism, there has been contemplated one in which compensation magnets are externally provided as means for compensating for the distortion of the output signal of the direction sensor due to such cause as the influence of the residual magnetism.

This prior art construction, however, requires considerations of various aspects such as the locality, number and magnetic flux intensity of the compensation magnets that are externally installed for cancelling the magnetic distortion of the direction sensor output due to such cause as residual magnetism, and therefore various complications are involved in the compensation. In addition, since the output distortion characteristics differ with the individual direction sensors, the compensation itself has to be varied with each direction sensor.

SUMMARY OF THE INVENTION

The invention is intended in the light of the above problems, and its object is to provide a direction indicator, which is provided with an adjustment section for setting up direct current magnetic fields cancelling the residual magnetism in a direction sensor by supplying direct currents of given intensities to two output coils of the direction sensor and making the maximum values of the output signals of the two output coils equal by adjusting the gain of these output signals, thus permitting accurate detection of the true direction through the compensation of the output signal of the direction sensor for the influence of the residual magnetism and so forth without provision of any compensation magnet.

BRIEF DESCRIPTION OF THE DRAWINGS

FIG. 2 is a waveform chart showing signals for illustrating the operation of the embodiment of FIG. 1;

FIGS. 3 and 4 are views illustrating the principles of the operation of the embodiment of FIG. 1;

FIG. 5 is a schematic representation of a second embodiment of the invention.

DESCRIPTION OF THE PREFERRED EMBODIMENTS

Figure 1:
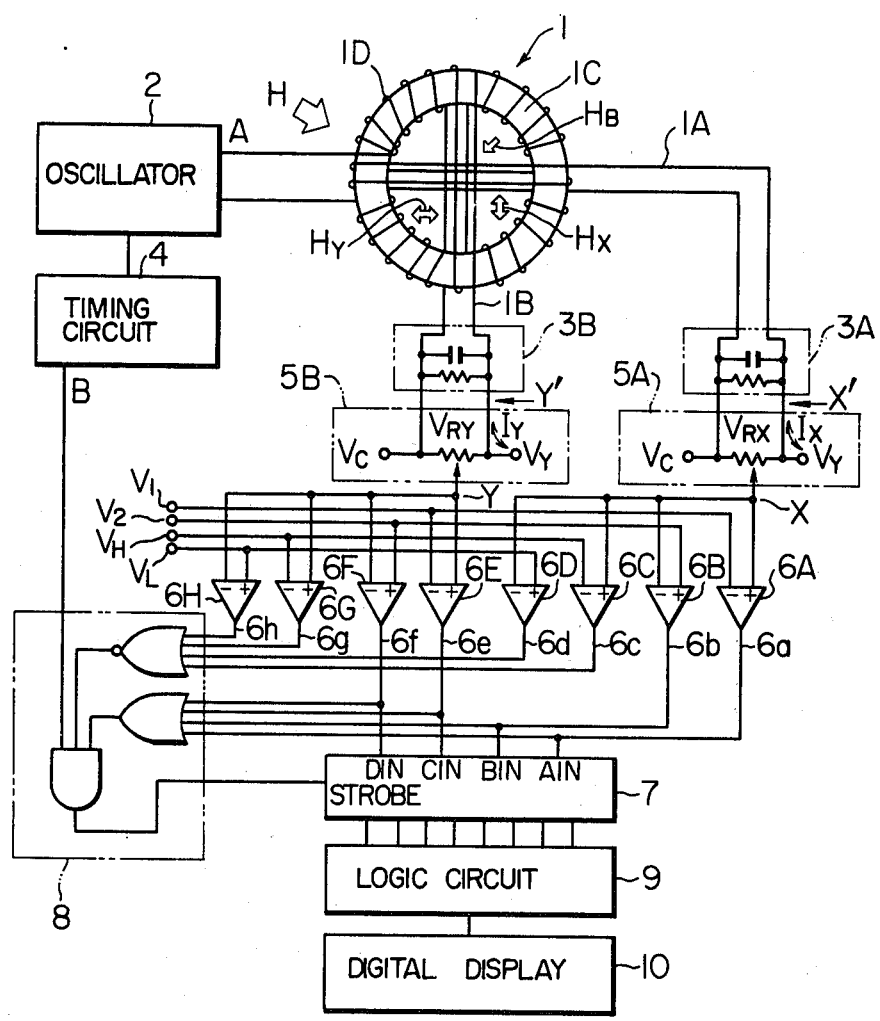
FIG. 1 is a schematic representation of a first embodiment of the invention.

Now, an embodiment of the invention will be described with reference to the drawings. FIG. 1 is a schematic representation of an embodiment of the invention applied to a direction indicator based upon 8-bearing-section digital display. Designated at 1 is a direction sensor, which comprises an exciting coil 1D wound on a ferromagnetic core 1C and output coils 1A and 1B wound thereon in a perpendicular relation to each other. Designated at 2 is an oscillator which provides a rectangular output signal (as shown in (a) in FIG. 2) for exciting the exciting coil 1D at a frequency f. The magnetic field in the core 1C varies according to the intensity H of the horizontal component of the earth magnetic field, and outputs proportional to the intensity are obtained from the respective output coils 1A and 1B and coupled to respective filters 3A and 3B, which provide respective outputs X' and Y' (as shown in (b) and (c) in FIG. 2) at a frequency of 2f. The outputs X' and Y' vary with the orientation of the direction sensor, i.e., according to the direction of progress of the vehicle or the like on which the direction sensor is mounted. When this direction sensor 1 is rotated in a parallel magnetic field (with a horizontal component intensity of H), denoting the X and Y components of the residual magnetism $H_B$ in the direction sensor 1 respectively by $H_{BX}$ and $H_{BY}$, the proportionality constants for the output coils 1A and 1B respectively by $K_X$ and $K_Y$ and a reference voltage by $V_c$, the relation of the values of the outputs X' and Y' in the timing of the signal B from a timing circuit 4 shown in (d) in FIG. 2 and the rotational angle $\theta$ of the direction sensor 1 is given as $$X' = K_X \cdot H \sin\theta + K_X \cdot H_{BX} + V_c$$

(where $K_X$ is a constant) and $$Y' = K_Y \cdot H \cos\theta + K_Y \cdot H_{BY} + V_c$$

(where $K_Y$ is a constant).

When $V_c = 0$ (volt), the X' and Y' co-ordinates describe an elliptical locus with the center shifted from the origin as shown in FIG. 3. To cancel the X component $H_{BX}$ of the residual magnetism $H_B$ in the direction sensor 1 with the generation of a direct current magnetic field $H_X$, the adjustment voltage $V'_X$ of an X output adjustment circuit 5A is adjusted (to about 1/10 of the peak of the reference voltage $V_c$ plus and minus the rectangular signal A) by causing a current $I_X$ in the output coil A, and to cancel the Y component $H_{BY}$ of the residual magnetism $H_B$ with the generation of a direct current magnetic field $H_Y$ the adjustment voltage $V_Y$ of a Y output adjustment circuit 5B is adjusted (to about 1/10 of the peak of the reference voltage $V_c$ plus and minus the rectangular signal A) by causing a current $I_Y$ in the output coil 1B. By cancelling the residual magnetism $H_B$ in the direction sensor 1 with the X and Y output adjustment circuits 5A and 5B which constitute an adjustment section and making the maximum values of the outputs X and Y equal through gain adjustment resistors $V_{RX}$ and $V_{RY}$, the relation of the values of the outputs X and Y of the X and Y output adjustment circuits 5A and 5B in the timing of the signal B from the timing circuit 4 ((d) in FIG. 2) and the rotational angle $\theta$ of the direction sensor 1 is $$X = K \cdot H \sin\theta + V_c$$

and $$Y = K \cdot H \cos\theta + V_c$$

Figure 4:
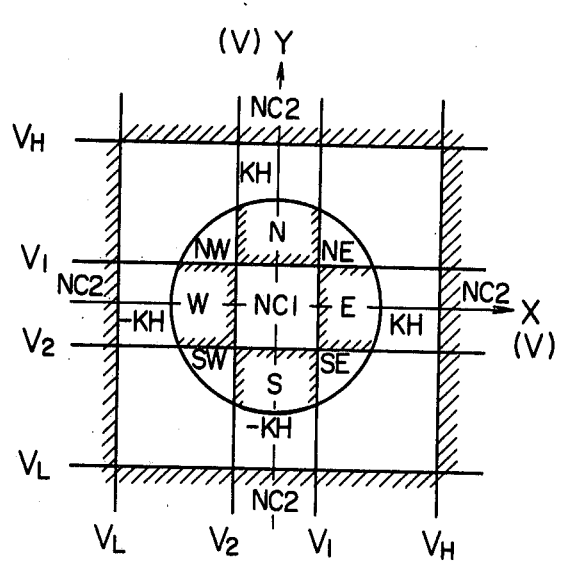

(where K is a constant), and with $V_c=0$ (volt) the X and Y co-ordinates describe a circular locus of a size (radius kH (volt), k being a constant) proportional to the horizontal component intensity H of the earth magnetism at the origin as shown in FIG. 4 (H being substantially constant and peculiar to each region of the globe). In the case of the 8-bearing-section digital display, since one bearing section subtends an angle of 45°, the predetermined comparison voltages $V_1$ and $V_2$ are $$V_1 = K \cdot H \sin 22.5° \approx 0.3827 \text{ kH (volt)}$$

and $$V_2 = -K \cdot \sin 22.5° \approx -0.3827 \text{ kH (volt)},$$

and the signals obtained by adjusting the signals from the output coils 1A and 1B are each divided into three different signal level portions.

The locus described by the values of the outputs X and Y is reduced with the reduction of the earth magnetism due to the external influence and is increased with the increase of the earth magnetism due to the external influence. Since the comparison voltages $V_1$ and $V_2$ are fixed for each region of the globe, it is likely that the displayed direction of progress of the vehicle is greatly deviated from the true direction if the earth magnetism is greatly disturbed. The predetermined voltages $V_1$ and $V_2$ are used for the comparison for determining whether the earth magnetism is excessively reduced, and predetermined comparison voltages $V_H$ and $V_L$ are used for the comparison for determining whether the earth magnetism is excessively increased. The comparison voltages $V_H$ and $V_L$ are set to $$V_H = 1.5 \text{ kH (volts)}$$

and $$V_L = -1.5 \text{ kH (volts)}.$$

Comparators 6A, 6B, 6C and 6D ("MC3302P" made by Motoroller Company) in FIG. 1 compare the X output with the respective comparison voltages $V_1$, $V_2$, $V_H$ and $V_L$, and comparators 6E, 6F, 6G and 6H compare the Y output with the respective afore-mentioned comparison voltages. The comparator outputs 6a to 6h collectively represent a corresponding direction of progress of the vehicle as shown in the Table below.

| X\Y | 6d | | 0 | | 0 | 1 |
|---|---|---|---|---|---|---|
| | 6c | | 0 | | 1 | 0 |
| | 6b | 0 | 0 | 1 | | |
| 6h 6g 6f | 6a/6e | 0 | 1 | 0 | | |
| | | 0 | 0 | NC1 | E | W |
| 0 0 0 | 1 | N | NE | NW | | |
| | | 1 | 0 | S | SE | SW |
| 0 1 | | | | | | |
| 1 0 | | | | | NC2 | |

For example, if the outputs 6a and 6b are both at "0" level, the output 6e is at "1" level and the output 6f is at "0" level, the direction of progress is "N" (the north). If the output 6a is at "1" level, the output 6b is at "0" level, output 6e is at "1" level, and output 6f is at "0" level, the direction of progress is "NE" (the North East). The comparator outputs 6A, 6B, 6E and 6F are coupled to a decoder 7 with a latch ("TC4514BP" made by Tokyo Shibaura Denki Company). When the X and Y outputs are in the normal region (other than regions NC1 and NC2), the comparator outputs 6A, 6B, 6E and 6F are latched at the timing of the signal B coupled from the timing circuit 4 through an inhibiting circuit 8, the decoded outputs are coupled to a logic circuit 9, and the logic output therefrom is coupled to a display section 10 for the digital display of the direction of progress of the vehicle or the like.

If the earth magnetic field intensity is too low, i.e., if the X and Y outputs are in the region NC1, or if the field intensity is too high, i.e., if the X and Y outputs are in the region NC2, the inhibiting circuit 8 functions to inhibit the coupling of the signal B from the timing circuit 4 to the strobe input terminal of the decoder with latch. Thus, until the signal B is subsequently coupled to the strobe terminal, the decoded outputs remain unchanged, so that the progress direction display immediately before the commencement of the disturbance of the earth magnetism is held until the normal earth magnetism is recovered.

While the above embodiment has concerned with the 8-bearing-section digital display, it will be obvious that in the case of the 4N-bearing-section digital display (N=1, 2, ...) the display error between the displayed vehicle progress direction and true direction due to great disturbance of the earth magnetism can be minimized through the comparison of the outputs of the X and Y output adjustment circuits 5A and 5B with the lowest absolute voltage level among N predetermined voltage levels and also with the predetermined voltage levels $V_H$ and $V_L$. Also, while the rectangular signal A at the frequency f has been used for exciting the exciting coil 1D with the oscillator 2, it is also possible to use a sinusoidal signal to this end. The digital display section of the display unit 8 may use fluorescent luminescent tubes, ordinary lamps, LEDs, etc., and also it may be based upon symbol display.

FIG. 5 shows a second embodiment of the direction sensor according to the invention. While in the preceding first embodiment the direction of progress has been digitally displayed, this embodiment makes analog display of the progress direction. Like parts are designated by corresponding reference numerals. Designated at 11A and 11B are hold circuits for holding the respective X and Y outputs at the timing of the signal from the timing circuit 4. Designated at 12 is an analog display section for displaying analogwise the direction of progress of the vehicle according to the outputs of the hold circuits 11A and 11B. If the earth magnetism is greatly disturbed, like the case of the first embodiment the signal B from the timing circuit 4 is inhibited by the inhibiting circuit 8 so that the outputs of the hold circuits 11A and 11B are held at the values immediately before the commencement of the disturbance of the earth magnetism. Thus, the display unit 12 continually displays the direction immediately before the disturbance until the normal earth magnetism is recovered.

Figure 6A:
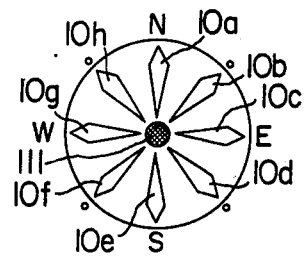
FIGS. 6A to 6E are schematic diagrams showing examples of heading indication by the heading indicators.
Figure 6B:
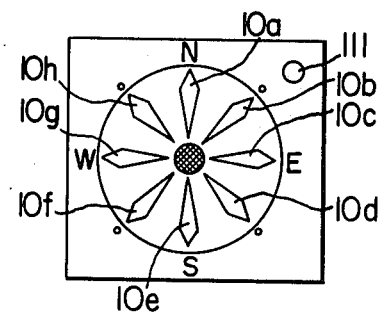
Figure 6C:
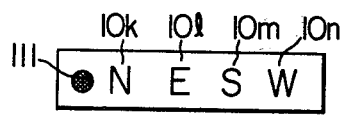
Figure 6D:
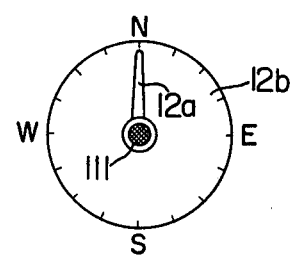
Figure 6E:
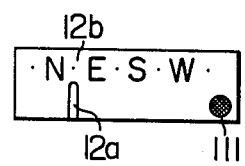

Next, examples of the abnormal field indication by means of the indicators 10 and 12 and the light-emitting diode 111 will be described with reference to FIGS. 6A to 6E. FIGS. 6A to 6C show examples of an abnormal field indication by means of the digital heading indicator 10 and the light-emitting diode 111, and FIGS. 6D and 6E show examples of an abnormal field indication by means of the analog heading indicator 12 and the light-emitting diode 111. Referring first to FIGS. 6A and 6B, numerals 10a to 10h designate display pieces for indicating eight directions of travel such that only that piece corresponding to the detected direction of travel is lighted, and numeral 111 designates the light-emitting diode. In FIG. 6C, numerals 10k to 10n designate symbolic displays for indicating directions of vehicle's travel such that the displays 10k and 10l are turned on simultaneously and the others are turned off when the direction of travel is NE or northeastward, only the display 10m is turned on and the others are turned off when the direction is S or southward and so on. The light-emitting diode 111 is lighted upon detecting an abnormality of the earth magnetic field. In FIGS. 6D and 6E, numeral 12a designates an indicating needle, and 12b a panel. The needle 12a is moved in response to the direction of travel of the vehicle to indicate the direction, and the light-emitting diode 111 is operated in the same manner as in the above-mentioned examples.

As has been described in the foregoing, according to the invention, direct current magnetic fields for cancelling the residual magnetism in the direction sensor set in earth magnetism are generated by supplying direct currents of given intensities to two output coils of the direction sensor, while the maximum values of the output signals of these two output coils are made equal through the adjustment of the gains of these output signals, so that it is possible to reliably cancel the residual magnetism in the direction sensor and remove the distortion of the output signals, thus permitting accurate detection of the true direction without need of providing any compensation magnet.

We claim:

1. A direction indicator comprising a direction sensor including a core, an exciting coil wound on said core set in earth magnetic field and two output coils wound on said core to cross at right angles with respect to each other to surround opposing portions of said core, means for specifying a particular direction on the basis of signals obtained from said two output coils of said direction sensor, and means for setting up direct current magnetic fields canceling the residual magnetism in said direction sensor by supplying direct currents of given intensities to said two output coils and making equal the maximum values of the output signals of said two output coils by adjusting the gain of these output signals.

2. An indicator according to claim 1, further comprising an oscillator circuit for exciting said exciting coil, a timing circuit for generating a timing signal in synchronism with said oscillator circuit, means for filtering the output signals of said output coils, comparison means for comparing said filtered output signals with first and second reference voltages for the purpose of sensing normality of the earth magnetic field and third and fourth reference voltages for the purpose of sensing abnormalities of the earth magnetic field, a decoder/latch circuit responsive to comparison outputs of said comparison means resulting from the comparison between said filtered outputs and said first and second reference voltages and said timing signal to generate a decoded signal, an inhibition circuit responsive to all outputs of said comparison means so as to sense disturbance of the earth magnetic field and thereby to prevent application of said timing signal to said decoder/latch circuit, and logic means responsive to said decoded signal.

3. An indicator according to claim 1, further comprising an oscillator circuit for exciting said exciting coil, a timing circuit for generating a timing signal in synchronism with said oscillator circuit, means for filtering output signals of said output coils, comparison means for comparing said filtered output signals with first and second reference voltages for normal earth magnetic field sensing purposes and third and fourth reference voltages for abnormal earth magnetic field sensing purposes, hold circuit means for holding said filtered output signals in response to said timing signal, an inhibition circuit responsive to all outputs of said comparison means so as to sense disturbance of the earth magnetic field and thereby to prevent application of said timing signal to said hold circuit means, and analog indicator means for indicating said held signals.

* * * * *